Oct. 30, 1934.　　　F. L. DARLING　　　1,978,522
VESSEL CAPPING MACHINE
Filed Aug. 7, 1931　　6 Sheets-Sheet 2
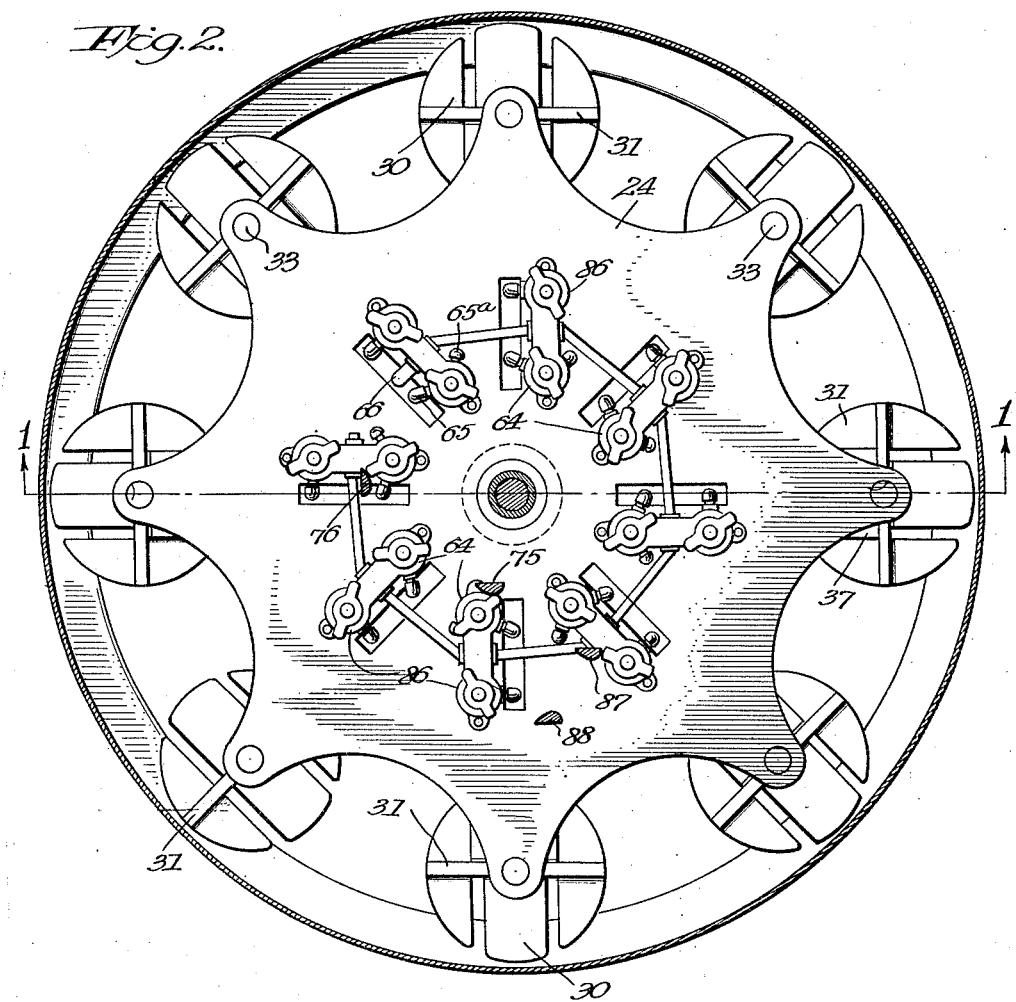
Fig. 2.
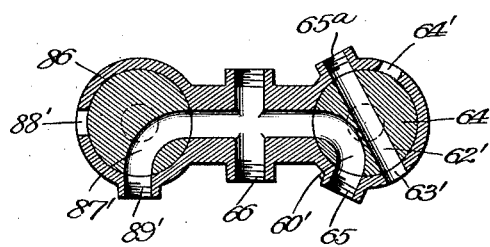
Fig. II.
Inventor
Frank L. Darling.
By Cushman Bryant Darby Hendway
Attorneys Oct. 30, 1934.  F. L. DARLING  1,978,522
VESSEL CAPPING MACHINE
Filed Aug. 7, 1931  6 Sheets—Sheet 4

Inventor
Frank L. Darling
By Cushman Bryant Darby Cushman
Attorneys

Oct. 30, 1934.  F. L. DARLING  1,978,522
VESSEL CAPPING MACHINE
Filed Aug. 7, 1931  6 Sheets-Sheet 5
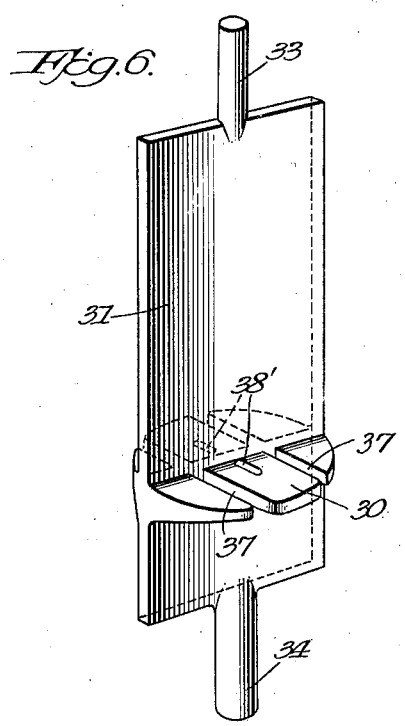
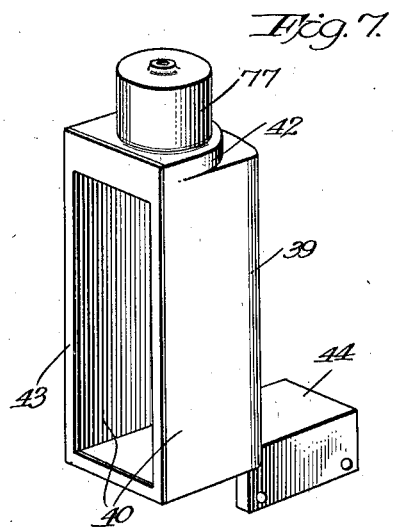
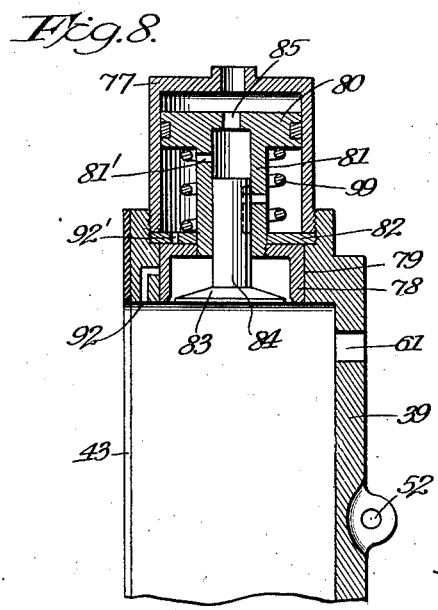
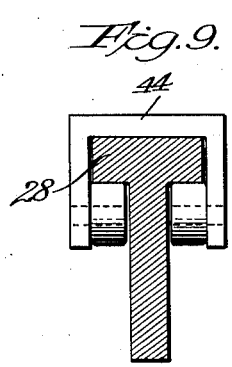
Inventor
Frank L. Darling.
By
Attorneys

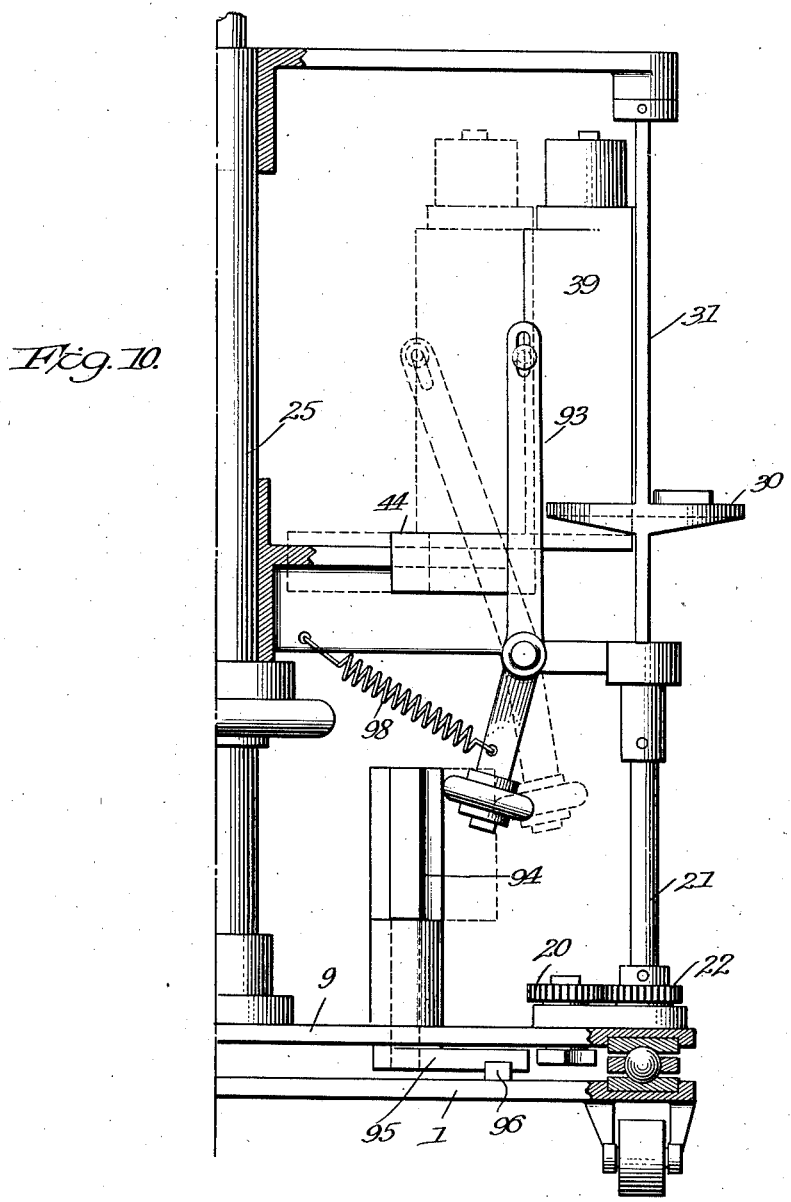

Patented Oct. 30, 1934

1,978,522

UNITED STATES PATENT OFFICE 1,978,522

VESSEL CAPPING MACHINE

Frank L. Darling, Baltimore, Md., assignor to Crown Cork & Seal Company, Inc., Baltimore, Md., a corporation of New York Application August 7, 1931, Serial No. 555,785

30 Claims. (Cl. 226—82)

My invention relates to machines for securing caps, and particularly crown caps, on bottles, jars, and other vessels in which foods and drinks are stored.

Many foods, in order to prevent spoiling, must have the air withdrawn from the container before the caps are secured and sealed in place. Attempts have heretofore been made, in some instances, to accomplish this result by filling the vessels to overflowing and then capping the same; this process results in messing the exterior of the vessels as well as the supports on which the vessels set while the capping operation takes place. Other attempts have been made to evacuate the vessels and depend on the partial vacuum for holding the caps in place until the vessels can be conveyed to the capping machine, but this method has not proven satisfactory for the reason that the negative pressure in the vessel does not always hold the cap tight, but on the contrary air frequently leaks in before the cap can be secured to the vessel.

Further, in order to insure a tight seal of the cap to large mouth vessels it is also desirable to create a partial vacuum in the vessel for assisting the cap's skirt prongs as a means for securely holding the cap air-tight on the vessel's mouth. Heretofore difficulty has been experienced in creating a negative air pressure in the vessel and maintaining it while clinching the cap in place; the action of the capping die sometimes moves the cap which lays over the vessel's mouth just enough to break the vacuum, a thing that is usually not discoverable except through spoilation of the contents of those particular vessels so improperly capped.

Attempts have also been made to provide machines which will apply the cap in vacuo; such means have evacuation cylinders that let down vertically over the vessels to be capped but the long time interval necessary in the machine's cycle in order to lower the evacuation chamber over a vessel to be capped and raise it again so the capped vessel may be removed, render such machines slow in action and does not give a sufficient machine capacity per hour to render the machine commercially successful.

Where the evacuation of the vessel is effected by a machine separate from the capping machine, it is necessary, as before intimated, to rely on the partial vacuum to hold the cap in place until the vessel reaches the capping machine and the cap has been secured to the vessel. It is in this interval of time that leakage of air into the vessel most frequently occurs.

My invention, therefore, has for an object to overcome the above deficiencies in prior practice and to provide a single machine in which the air is exhausted from the vessel and the cap securely fastened in place, all in a very short space of time and in a manner best calculated to increase the capacity and efficiency of the machine.

Further, it is an object to provide a machine which may be used to air-exhaust and cap vessels of different heights and cross section, be they round or angular by a simple adjustment of the levers of the turn tables on which the vessels are placed.

Again, it is an object to provide a machine of the character described in which a relatively long time interval is given to the air-exhausting process and a relatively short time interval to the capping operation in order to insure as complete an evacuation of air as possible before the cap of the vessel is clinched down by the capping die and to effect this clinching-down action while the negative air pressure in the vessel is at its maximum.

Further, it is an object to provide an effective means to produce individual vacuum chambers for the several supplemental or auxiliary vessel-carrying tables, a means that is simply constructed, easily actuated and very effective in its result-producing characteristics.

Further, it is an object to provide a machine in which the parts are so designed and coordinated that the direct thrusts of the capping dies are transmitted in straight lines to the surface on which the machine as a whole rests, thereby preventing distortion, bending or other undue strains on the moving parts of the machine.

Further, it is an object to provide a self-contained machine in which all motion producing mechanism for the several moving parts are arranged in a compact manner within the compass of the machine itself, a machine which is electrically driven and one which only requires connection to a current supplying socket and to the pipe line of an evacuator.

Again, it is an object of the invention to provide a machine of the kind referred to above in which the exhaust of the vacuum chamber and the constant withdrawal of air from the vessels during the exhausting period will take place gradually, i. e., the exhaust suction will be applied in gradually increasing degree from the starting point of the exhausting station to the terminating point thereof, thus preventing the lifting or blowing off of the caps which rest on the vessel's mouth by their own weight when the vessel is put into the machine; this also prevents removal of any liquid and solid matter contained in the vessel such as would occasionally occur were full negative pressure applied instantly.

Further, it is an object to provide a machine wherein the auxiliary turntables are locked against rotary movement by the evacuation chamber walls when the evacuation chamber is in its operative position but will instantly be freed for turning as soon as the evacuation chamber is withdrawn.

Further, it is an object to provide means whereby the sealing face of the evacuation chambers and the closing walls of the auxiliary turntables will have sufficient play so that they will find themselves even though, from wear in bearings, looseness in gears, etc., some play is present, thereby insuring full contact between the rim of the evacuation chambers and the auxiliary turntable walls with which they engage and thus prevent air leakage during the evacuation period.

A further object is to provide an air operated capping mechanism so cooperative with the evacuation function that the exhaustion of the air from the evacuation chambers will cause the capping dies to be sucked into contact with the loose caps on the vessels and prevent their mis-alignment with the vessels during the evacuation process.

Other objects will in part be obvious and in part be pointed out hereinafter.

To the attainment of the aforesaid objects and ends, the invention still further resides in the novel details of construction, combination and arrangement of parts, all of which will be first fully described in the following detailed description, then be particularly pointed out in the appended claims, reference being had to the accompanying drawings, in which:

Figure 2 is a top plan view, the hood being removed.

Figure 6 is a detail perspective view of one of the auxiliary turntables.

Figure 7 is an enlarged perspective view of one of the evacuation chambers.

Figure 8 is an enlarged detail vertical section of a portion of same.

Figure 9 is a detail cross section on the line 9—9 of Figure 1.

Figure 10 is a vertical longitudinal section of a modification of the invention.

Figure 11 is a sectional view of the valve mechanism for controlling the supply of pressure to the capping die cylinder and the operating piston.

Figure 1:
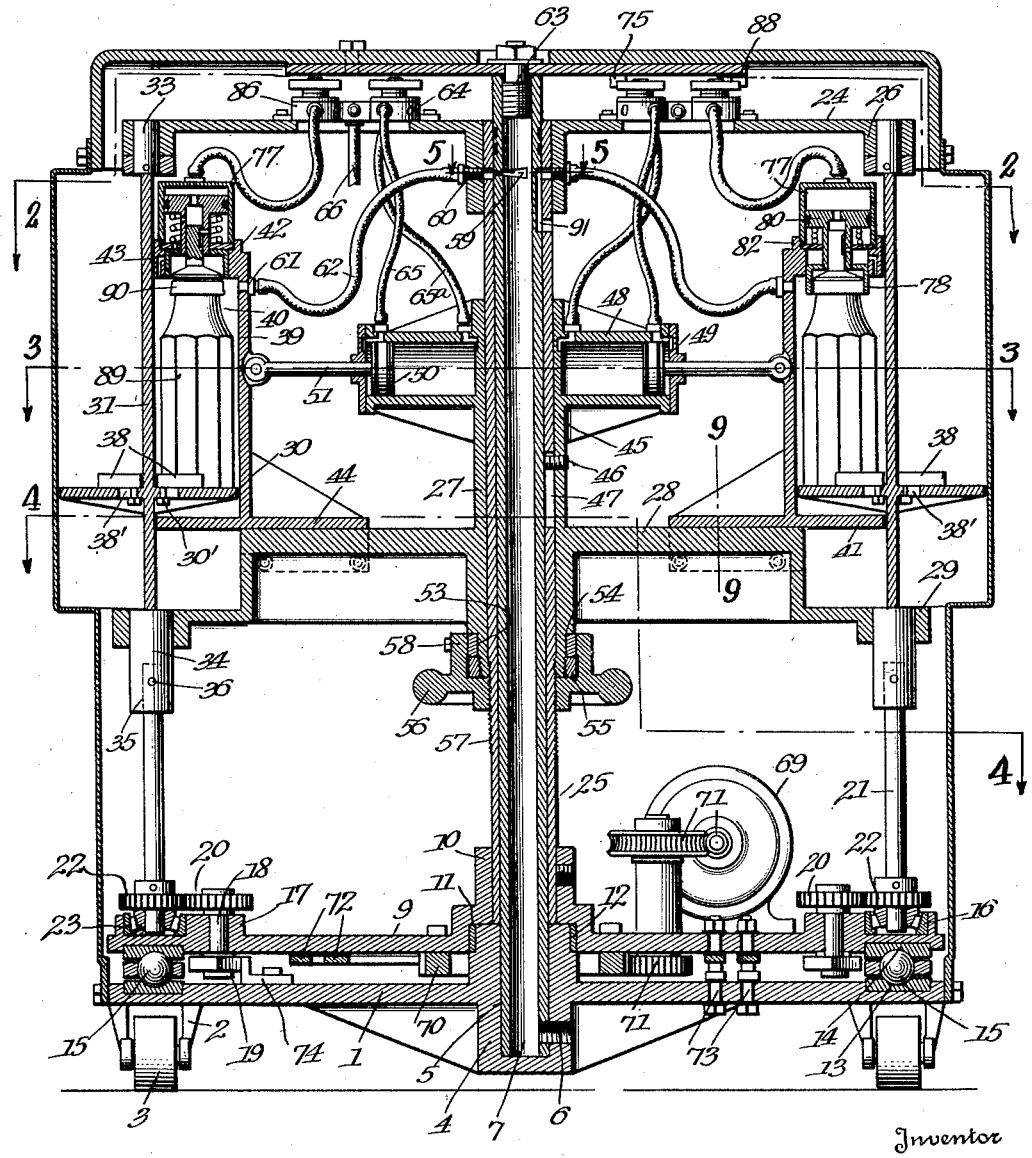
Figure 1 is a vertical longitudinal section of my machine taken on the line 1—1 of Figure 2.

In the drawings in which like numerals and letters of reference indicate like parts in all of the figures, 1 represents the base which, on its underside, is provided with ears having bearings for the pins of the ground wheels 3, by means of which the apparatus may be transported from place to place. These ground wheels may be of fixed character or casters as preferred, fixed wheels being illustrated for purposes of illustration. The base is provided with a central boss 4 having a socket 5 for the reception of the hollow non-rotatable column 7 that is secured in the socket 5 in any approved way against rotation. This may be done by welding or otherwise or by threading the pipe from the vacuum line into the threaded openings 6 and 8 sufficiently far to act as a set screw.

9 is the main turntable which is provided with a hub 10 and a socket 11 to fit over the upper end of the boss 4 as a bearing, there being a bearing bushing 12 provided for the usual purposes.

The base 1 and the turntable 9 on their opposed faces are provided with ball raceways 13 and 14 respectively in which suitable bearings balls 15 are located whereby the turntable 9 may have its weight carried entirely by the balls and be susceptible of turning with very little friction.

The base of the turntable include suitable bearing cups 16 and bearing bosses 17, the latter being provided for the stub shafts 18, each of which carries, on its lower end, a star wheel 19 and on its upper end a pinion 20, the latter meshing with a gear 22 on the individual turntable rotating shaft 21, it being understood that there are a number of these shafts 21 arranged around the main turntable concentrically with its axis and parallel thereto, eight being illustrated in the drawings.

23 is a roller bearing preferably of the Timken type for lateral and up and down thrusts. The main turn table also includes an upper spider 24 having a hub to fit over the upper end of an outer tubular column 25 that is rigidly secured in the hub 10 by welding or other suitable ways and is similarly rigidly secured to the hub of the upper spider 24 so that the shaft bearings 26 of the upper spider will align with the bearing cups 16 of the base of the turntable. The main turntable also includes a lower spider 27 which has slide bearing arms 28 terminating in shaft bearings 29, the latter aligning with bearings 26 and the cups 16.

30 designates the auxiliary turntables, each of which includes a base divided by a division plate consisting of upper and lower portions 31 and 32 respectively. Along the axes of the auxiliary turn tables at each end of the division plate are cylindrical bearings 33 and 34, the former operating in the bearing 26 and the latter in the bearing 29, the latter having a socket 35 for the reception of the upper end of the shaft 21, which shaft is pinned to the socket as at 36.

The base of the turntable 30 is provided with parallel slots 37 at right angles to the division plate and the base carries at each side of the division plate and between the vertical slots, adjustable vessel-positioning devices 38 of any suitable construction are mounted in slots 38' by the bolts 30', these devices being slidably mounted from and toward the plate 31 for purposes of adjustment.

39 designates the U-shaped evacuation chambers which carry the capping dies. These chambers include side wings 40 which move within the slots 37, a bottom 41 and a top 42, the outer face of the chambers being open and the outer edges of the top side and bottom plates being rubber-faced as at 43 in order to enable an air-tight contact to be effected between the evacuation chambers and its plates 31—32.

Each evacuation chamber 39 is provided with a slide bearing 44 which operates on a slide bearing cross arm 28 of the lower spider 27.

The hub 45 of the lower spider 27 is mounted to rise and fall on the rotatable outer tubular column 25 but is held from turning on that column by a suitable means as for instance a pin and slot connection 46—47.

The hub 45 in the first embodiment of the invention carries a group of cylinders 48, one for each evacuation chamber unit. In each cylinder is a piston 50 whose connecting rod 51 passes through the cylinder head 49 and is pivotally connected at 52 to the inner wall of its evacuation chamber 39, whereby as the piston 50 is moved outwardly and inwardly the vacuum chamber 39 will be brought into engagement with or removed from the division plate 31—32 as the case may be.

The hub 45 of the lower spider is provided with a groove 53 in which is a thrust collar 54 retained by a nut 55 and connected to a hand wheel 56 by a suitable connection 58, the hand wheel being threaded at 57 on the outer tubular column so that by turning the hand wheel 56 the lower spider 27 may be raised and lowered and thereby raise and lower the evacuation chambers accordingly to allow for different heights of vessels.

Suitable valve devices are provided for controlling the application of the suction to the evacuation chambers during proper time intervals. For convenience of illustration I have indicated such a valve mechanism as consisting of a triangularly shaped valve port 59 in the hollow non-rotating column 7 and a series of ports 60 one for each evacuation chamber and connected therewith by suction lines 62 entering the respective evacuation chambers at 61. 63 is a plug for closing the upper end of the hollow column 7 to prevent air leakage into the same. It should be understood that the triangular port 59 is so located that its advance point will be in alignment with a port 60 of the extreme left hand unit shown in Figure 2 just after that unit starts to leave its position and travel around to a position forty-five degrees between the right hand and lower positions in Figure 2, the maximum opening effect of the port being produced just before the unit arrives at the forty-five degree position to the right below center in Figure 2.

64 designates the reversing valves for the cylinders 48, there being a rotary plug valve for each cylinder having four-way ports, one connecting with the air tank 67 by a feed line 66, another 65 leading to the front end of the cylinder, and a third 65a leading to the rear of the cylinder, the fourth port being open to atmosphere through ports 63' and 64'. Thus, when the valve is in one position compressed air will pass from duct 66 to duct 65a through curved passage 60' in the valve to force the piston outwardly, the duct 65 being then in communication with the atmosphere through registration of passage 62' therewith and with the port 64' and when the valve 64 is in another position (Fig. 11) the duct 65a will be in communication with the atmosphere through port 63' at which time the duct 66 is in communication with the duct 65 through passage 60'. Any suitable valve now on the market may be used.

The operation of the valve 64 is effected by cams 75 and 76, that may be connected to the underside of the tap, the first cam moving the valve to a position to cause compressed air to be fed into the inner end of the cylinder through port 65a and the registration of the curved passage 60' with ports 66 and 65a to move the piston outwardly while the cam 76 moves the valve 64 to effect an inward movement of the piston through registration of the port 60' with the ports 66 and 65.

67 represents a suitable air tank, 68 a compresser, connected therewith, and 69 a motor for operating the compresser and turning the turntables, the tank, the compresser and the motor may be mounted on the base of the main turntable and turn with it.

70 is a gear fixed on the hub 4 that meshes with a pinion of a gear train 71 from the motor by which the motor effects a rotation of the turntable at the proper speed.

72 are current conductor rings to which the motor terminals are connected and which receive current through the contacting brushes 73 on the base 1 that are connected by a suitable cable with the source of current supply not shown.

74 is a pin-rack for meshing with the star wheels 19, the pin-rack being secured to the base 1 in such a position that it will be engaged by the star wheel of a unit just as that unit begins to move from a lowermost position in Figure 2 to the extreme left hand position in that figure. During this quarter circle of movement the auxiliary turntable is given a one-half turn on its axis.

77 designates the capping die cylinder carried by the top of each evacuation chamber 39, 78 designates the capping die, 79 the capping die's guideway in the top 42 of the evacuation chamber, 80 a piston connected with the capping die 78 by a hollow piston rod 81 which passes through a partition plate 82 closing the lower end of the cylinder 77.

83 is the cap holding down plunger head whose plunger 84 operates in the hollow piston rod 81. An air port 85 delivers compressed air from the cylinders 77 above the piston 80 into the hollow rod 81 to impel the plunger 84 downwardly to hold the plunger head 83 on the cap 90 over the vessel 89.

86 is a valve controlling the supply and exhaust of air to the cylinders 77 from the tank 67, the valves 86 of the several units being operated by cams 87 and 88, the former serving to shift the valves to effect an air supply to the cylinders through curved passage 87' which registers with port 89' leading to the cylinders and port 66 that communicates with the air tank 67 at proper times while the cams 88 are so located as to effect a release of air from those cylinders at other times through movement of the passage 87' to register with the port 89' and the discharge port 88'.

A relief port 91 is provided in the columns 7 and 25 which, when a port 60 registers with it, will release the vacuum within the evacuation chambers 39 so that its piston will easily pull it from the wall 31 against which it has been resting. To insure a quick breaking of the vacuum there may be provided the bleed ports 92, 92' and 81' which are controlled by the dies 78 and plunger 84, that pass compressed air from the cylinders 77 after the cap has been crimped into the evacuation chambers 39.

In the second embodiment of the invention, instead of operating the evacuation chambers 39 by means of compressed air, suitable lever systems 93 may be provided, operated by a spring 98 and a cam 94 having a crank 95 set by suitably positioned stop tracks 96 to advance and retract the evacuation chambers at the proper place and hold them against their respective plates 39, 32, during proper intervals of time.

*Operation*

Assume current to be turned on to the motor 69 by plugging the electric cord into a wall socket or other suitable current supply and assume a vacuum line from the evacuator (not shown) connected at 6 to the machine.

Figure 3:
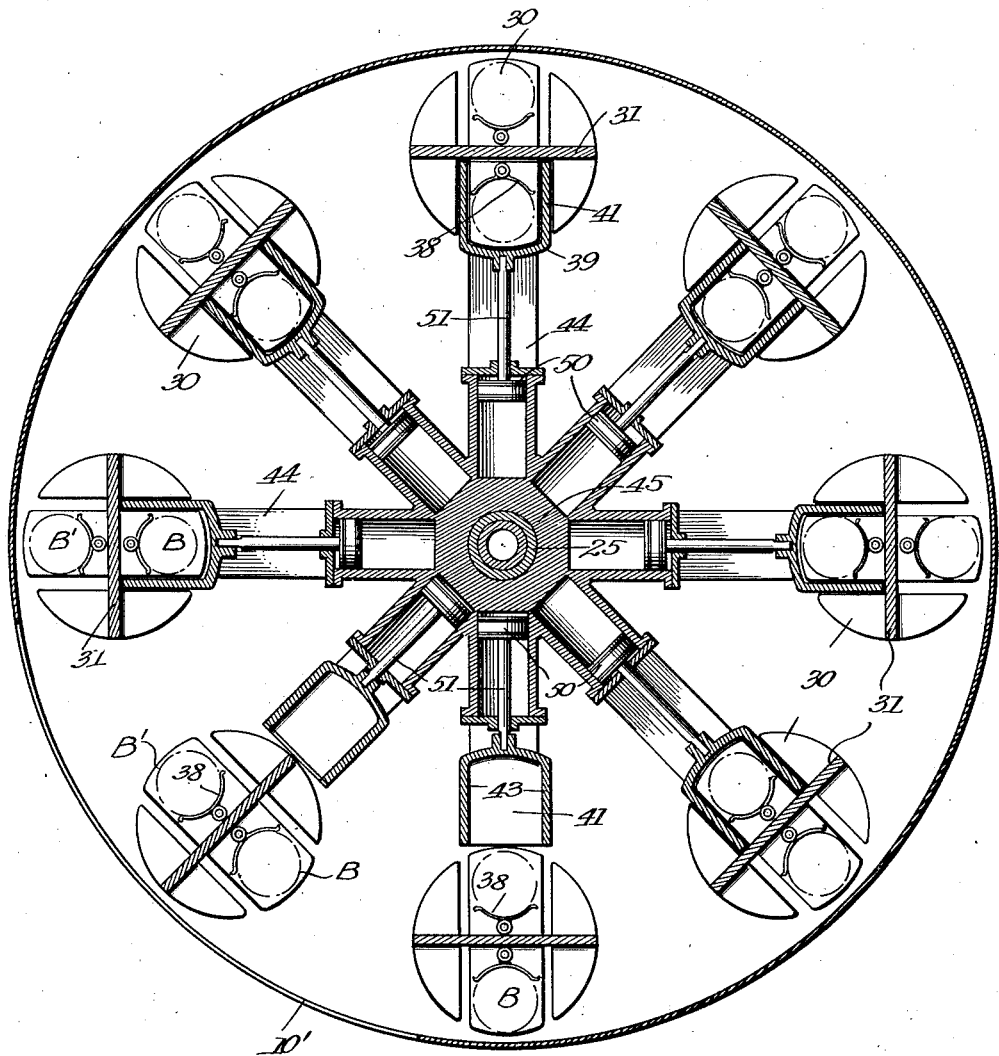
Figure 3 is a horizontal section on the line 3—3 of Figure 1.
Figure 4:
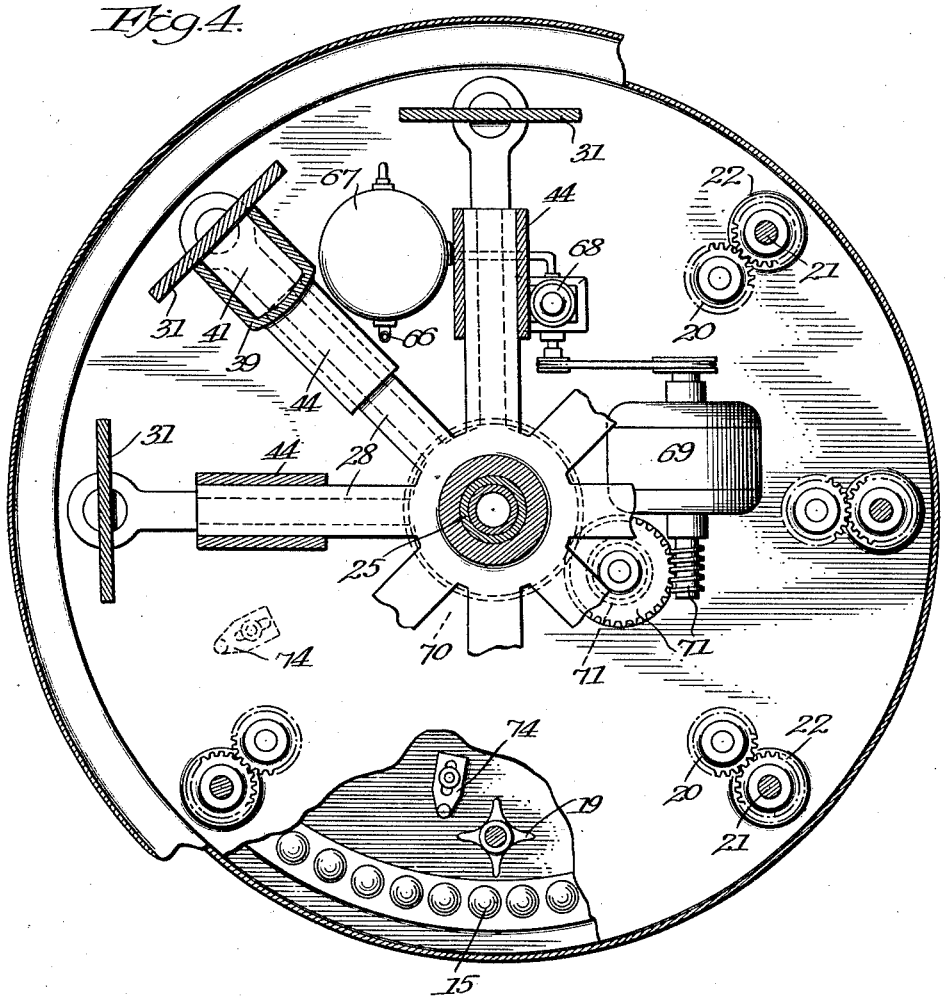
Figure 4 is a horizontal section on the line 4—4 of Figure 1.
Figure 5:
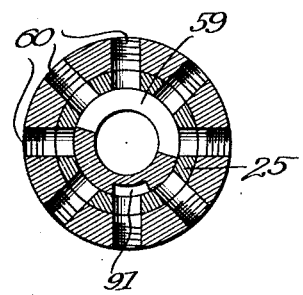
Figure 5 is a detail cross section on the line 5—5 of Figure 1.

The main turntable now revolves in say a clockwise direction in Figures 2 and 3. The auxiliary turntable unit at the lowest place in Figure 2 now begins to rotate counterclockwise, i. e. in a direction opposite that of the main turntable, thus carrying the vessel B which has been placed on the base 30 of the turntable toward the inside of the machine and carrying the previously capped vessel B' toward the outside of the machine where it may be removed through the opening 10' (Fig. 3) in the side wall of the machine casing and replaced by an uncapped vessel at leisure anywhere from the extreme left hand position in Figure 2 to the lowermost position in that figure. That portion of the arc of movement of the machine from the lowermost position of the unit in Figure 2 to the extreme left hand position of a unit, i. e. the lower left hand ninety degrees may be termed the loading and unloading station, while that portion of the arc of movement of the main turntable from the extreme left hand unit around to the unit at forty-five degrees to the right of the lowermost unit in Figure 2 may be termed the evacuation station (225 degrees) while the remaining forty-five degrees of the arc may be termed the capping station.

The uncapped vessels may be placed on the auxiliary turntable anywhere around the evacuation and capping stations as may be most convenient to the attendant.

Now as the unit arrives at the extreme left hand position in Figure 2, the vessel B will be located inside and the vessel B' will be located outside of the machine.

On passing from the position at the bottom of Figure 2 the auxiliary turntable unit will be revolved counterclockwise through one-half revolution and as it arrives at the extreme left hand position in Figure 2, the valve 64, which controls the compressed air supply to the cylinder 48 of that unit, will be shifted so as to deliver compressed air against the inner side of the piston 50 and thereby force the evacuation chamber 39 of the unit outwardly until it contacts the partition wall 31—32 of that unit. As soon as this shall have been accomplished, the unit is locked against rotation and as it passes from the extreme left hand position in Figure 2 through a succeeding arc of from 180 to 225 degrees, the air in the chamber 39 of that unit will be exhausted to the desired degree, thereby withdrawing the air correspondingly from the vessel now contained within the evacuation chamber.

As the unit reaches the end of the evacuation station, i. e. a position forty-five degrees to the right of the starting place in Figure 2, the valve 86 which controls the flow of compressed air to the capping die of that unit will be opened and the die forced downwardly to crimp the cap onto the mouth of the vessel in the manner as shown on the right hand side of Figure 1. Just as soon as this has been done, the vacuum valve 59—60 will be closed and also duct 60 will be placed into communication with the atmosphere via port 91; at the same time air under pressure will leak through the ports 92, 92' and 81' into the evacuation chamber and assists in quickly breaking the vacuum so that as the unit moves from the lower forty-five degree position in Figure 2 toward the lowermost position the valve 64 of that unit will be shifted so as to connect the inner end of the cylinder 48 corresponding to the unit, with the atmosphere and the outer end of the cylinder with the source of compressed air supply to thereby force the piston 50 inwardly and withdraw the evacuation chamber from the auxiliary turntable to unlock it and free the table so that it may be turned again in starting on its next cycle of movement.

In the second embodiment shown in Figure 10 instead of operating the evacuating chambers by pneumatic means they are shifted at proper intervals by the system of cams and levers hereinbefore described but the operation or cycle of movement of the turntables and capping dies are essentially the same as before.

To cap vessels of different heights it is only necessary to adjust the position of the chambers 39 up or down according to the heights of the vessels to be capped, this adjustment being effected by the hand wheel 56 hereinbefore described.

As there will be more or less play in the slide bearing 44, also in the bearings 26 and 29 and in the gearing 20—22 I hinge the rods 51 on horizontal axes as at 52 to the evacuation chambers, thus allowing these chambers to accommodate themselves to their respective auxiliary turntable plates 31—32 to insure air tight contact throughout.

Heretofore in vacuum machines it has been difficult to enter the bottle to be treated in and out of the evacuation chamber and hold the vacuum during the evacuation process. Attempts have been made to accomplish this in some instances by the use of long sleeves or cylinders that rise perpendicularly to permit the bottle to be placed under them, after which they are then shoved down by suitable means, thus completing a seal on the base where the bottle rests. Inasmuch as vessels to be evacuated vary a great deal in height it is necessary where the piston type of vacuum machine is used, to use a large portion of the cycle of the machine in placing the bottle in and taking it out of the evacuation chamber. By the means shown in my drawings I accomplish the desired results in a very simple manner by allowing the bottle to be placed on the shelf 30 and during a very short cycle of the machine to be turntabled in cooperation with the evacuation chamber which has a movement longitudinally of approximately one-third the height of the average tall receptacle containing food; obviously it is easier to move the evacuation chamber horizontally a short distance, and it requires less of the rotating cycle to do this than where means are employed to raise the evacuation chamber horizontally three times as far. It is also obviously easier to move the evacuation chamber back and forth in a horizontal position than to push the vessel to be treated into a fixed evacuation chamber which is done in some instances.

By the use of my means of turntabling the vessel to be treated into the position to be covered by the evacuation chamber and turntabling the treated vessel, which has already been capped, out of the position in the evacuation chamber, I greatly reduce the loss of time normally used in this operation, thus permitting the package to be treated to remain in the evacuation chamber a much longer period of time—this being accomplished by the combination of my turntable mechanism in conjunction with the evacuation chamber being horizontally slidably mounted.

Also the difficulty in the past where a pressed cap or crown closure was employed to seal the receptacle, it has been difficult to adjust the sealing mechanism to the height of the vessel to be sealed, which varies at times as much as ten inches. By the means shown in my drawings I raise and lower the evacuation chamber and capping mechanism independently of the turntable upon which the vessel rests, thus arriving at a very close adjustment to meet the varying sizes of vessels to be treated.

Another feature of my invention as heretofore described is,—it is not uncommon for a jar or vessel to be bursted under the crowning or closing pressures, thus spilling the contents inside the evacuation chamber and closing the machine down until same can be properly cleaned. By my invention a bursted bottle and spilled contents are automatically rotated out of the evacuation chamber and remain on the outside during three-quarters of a revolution of the machine, thus permitting the operator to wash same off with a hose without stopping the machine, and permits the placing of another bottle in position at the proper time in the cycle.

Another feature of my combination of the reciprocable evacuation chamber and the turntable device for rotating the jars, is the automatic centering of the sealing surfaces. There being a certain amount of play in the gears on the bottom of the turntable shaft to which the turntable is mounted, my invention makes provision to permit a slight oscillation to occur when the evacuation chamber is pressed against the sealing surfaces, thus centering and equalizing the face contact pressure in a horizontal direction. The evacuation chamber itself being more or less loosely connected to the means for sliding same automatically adjusts itself in the horizontal plane, thus creating a self-centering operation in the sealing surfaces which hitherto had not been obtained in a vacuum machine.

Because of the arrangement whereby the outer part of the mechanism including the turntable and evacuation chamber are permitted to rotate a fixed stationary shaft through which the vacuum is piped, it is a very simple matter to conduct the vacuum lines flexibly to the vacuum chamber without friction or sliding means, the only sliding means being in the V-valve 59—60. A gradual increasing vacuum pressure is permitted to enter the evacuation chamber without expensive distributing means and possibility of vacuum leaks and losses.

As will be noted by reference to Figures 1 and 8 when the dies 78 and piston 84 are in the elevated position, see Figure 8, (no air pressure being in the cylinder 77 above the piston 80) as soon as the vacuum is established in the evacuation chamber 39, the suction will draw down the piston 84 until it contacts with the cap and thus hold the cap centered over the vessel 89. This is made possible by reason of the fact that the bleeding port 92' in the partition 82 and the bleeding port 81' in the hollow piston rod 81 are in communication with the space above the piston 80 through the port 81' and the passage 85. The suction overcomes the tension of the spring 99 which normally holds the piston elevated. Thus there is no danger of the cap being laterally displaced over the mouth of the vessel during the evacuation process.

If desired the plunger 83 may be made of magnetic material and magnetized so that as the vessel is put into position the cap will be held up slightly from contact with the mouth of the vessel while the evacuation process begins.

While I have illustrated the preferred embodiments of my invention, it is obvious that other changes may be made in the details of construction, arrangement and form of parts as well as in the specific instrumentalities employed to give motion thereto, without departing from the spirit of the invention or the scope of the appended claims.

What I claim is:

1. In vessel capping machines, a main turntable, auxiliary turntables mounted on the main turntable to receive the vessels to be capped, a vessel capping die cooperatively associated with each auxiliary turntable, a movable evacuation chamber associated with each auxiliary turntable, means to bring the respective evacuation chambers into and out of cooperative relation to their respective auxiliary turntables at predetermined intervals, and means to produce a negative air pressure in the evacuation air chambers while they are in cooperative relation to their respective turntables, and means to actuate said capping dies at predetermined intervals.

2. In vessel capping machines, a main turntable, means to turn it in one direction, an auxiliary turntable carried by said main turntable, means to turn said auxiliary turntable in a direction reverse to that of the main turntable, said auxiliary turntable having a diametrically held partition dividing it into two sections, each section being designed to receive a vessel to be capped, a movable member associated with said partition for enclosing the vessel to be capped, means for interchanging the position of said sections at predetermined points in the path of travel of said turntable and means to cap one vessel at a time on the auxiliary turntable.

3. In vessel capping machines, a main turntable, means to turn it continuously in one direction, an auxiliary turntable carried by said main turntable, means to turn said auxiliary turntable intermittently in a direction reverse to that of the main turntable, said auxiliary turntable having a diametrically held partition dividing it into two sections, each section being designed to receive a vessel to be capped, a movable member associated with said partition for enclosing the vessel to be capped, means for interchanging the position of said sections at predetermined points in the path of travel of said turntable and means to cap one vessel at a time on the auxiliary turntable.

4. In vessel capping machines, a main turntable, means to turn it in one direction, an auxiliary turntable carried by said main turntable, means to turn said auxiliary turntable in a direction reverse to that of the main turntable, said auxiliary turntable having a diametrically held partition dividing it into two sections, each section being designed to receive a vessel to be capped, and means to cap one vessel at a time on the auxiliary turntable, and means cooperative with said auxiliary turntable for withdrawing air from the vessel prior to capping the same.

5. In vessel capping machines, a main turntable, means to turn it continuously in one direction, an auxiliary turntable carried by said main turntable, means to turn said auxiliary turntable intermittently in a direction reverse to that of the main turntable, said auxiliary turntable having a diametrically held partition dividing it into two sections, each section being designed to receive a vessel to be capped, means to cap one vessel at a time on the auxiliary turntable, and means cooperative with said auxiliary turntable for withdrawing air from the vessel prior to capping the same.

6. In vessel capping machines, a main turntable, a set of auxiliary turntables mounted around the axis of the main turntable on axes parallel thereto, means to turn the main turntable continuously in one direction to bring each auxiliary turntable past an evacuating station, then past a capping station and then past a loading and unloading station, means for withdrawing air from a vessel on the auxiliary turntable while passing the evacuation station, means to secure the cap to the air-evacuated vesssel as it passes the capping station, and means to rotate the auxiliary turntables on their axes as they pass the loading and unloading station.

7. In vessel capping machines, a main turntable, a set of auxiliary turntables mounted around the axis of the main turntable on axes parallel thereto, means to turn the main turntable continuously in one direction to bring each auxiliary turntable past an evacuating station, then past a capping station and then past a loading and unloading station, means for withdrawing air from a vessel on the auxiliary turntable while passing the evacuation station, means to secure the cap to the air-evacuated vessel as it passes the capping station, and means to rotate the auxiliary turntables on their axes as they pass the loading and unloading station, said auxiliary turntable having two vessel receiving sections diametrically opposite one another.

8. In vessel capping machines, a main turntable, a set of auxiliary turntables mounted around the axis of the main turntable on axes parallel thereto, means to turn the main turntable continuously in one direction to bring each auxiliary turntable past an evacuating station, then past a capping station and then past a loading and unloading station, means for withdrawing air from a vessel on the auxiliary turntable while passing the evacuation station, means to secure the cap to the air-evacuated vessel as it passes the capping station, and means to rotate the auxiliary turntables on their axes as they pass the loading and unloading station, said auxiliary turntable having two vessel receiving sections diametrically opposite one another, and means to position the vessel on the auxiliary turntables in proper locations to align with the capping means.

9. In vessel capping machines, a main turntable, a set of auxiliary turntables mounted around the the axis of the main turntable on axes parallel thereto, means to turn the main turntable continuously in one direction to bring each auxiliary turntable past an evacuating station, then past a capping station and then past a loading and unloading station, means for withdrawing air from a vessel on the auxiliary turntables while passing the evacuation station, means to secure the cap to the air-evacuated vessel as it passes the capping station, and means to rotate the auxiliary turntables on their axes as they pass the loading and unloading station, said means for withdrawing air comprising a shiftable chamber and a cooperating partition wall on each auxiliary turntable together with devices for moving said chamber into and out of cooperative relation to the auxiliary turntable as it arrives at the evacuation station and after it leaves the same.

10. In vessel capping machines, a main turntable, a set of auxiliary turntables mounted around the axis of the main turntable on axes parallel thereto, means to turn the main turntable continuously in one direction to bring each auxiliary turntable past an evacuating station, then past a capping station and then past a loading and unloading station, means for withdrawing air from a vessel on the auxiliary turntable while passing the evacuation station, means to secure the cap to the air-evacuated vessel as it passes the capping station, and means to rotate the auxiliary turntables on their axes as they pass the loading and unloading station, said means for withdrawing air comprising a shiftable chamber and a cooperating partition wall on each auxiliary turntable together with devices for moving said chamber into cooperative relation to its auxiliary turntable as the auxiliary turntable reaches the beginning of the evacuation station and for moving same out of cooperative relation to its auxiliary turntable as the auxiliary turntable reaches the beginning of the loading and unloading station.

11. In vessel capping machines, a main turntable, a set of auxiliary turntables mounted around the axis of the main turntable on axes parallel thereto, means to turn the main turntable continuously in one direction to bring each auxiliary turntable past an evacuating station, then past a capping station and then past a loading and unloading station, means for withdrawing air from a vessel on the auxiliary turntable while passing the evacuation station, means to secure the cap to the air-evacuated vessel as it passes the capping station, and means to rotate the auxiliary turntables on their axes as they pass the loading and unloading station, said means to secure the cap comprising capping dies and means to bring them into cooperative position to the auxiliary turntable and retain them there while the auxiliary turntable is passing the evacuation station, and means to actuate the dies as the auxiliary turntable leaves the evacuation station.

12. In vessel capping machines, a main turntable, a set of auxiliary turntables mounted around the axis of the main turntable on axes parallel thereto, means to turn the main turntable continuously in one direction to bring each auxiliary turntable past an evacuating station, then past a capping station and then past a loading and unloading station, means for withdrawing air from a vessel on the auxiliary turntable while passing the evacuation station, means to secure the cap to the air-evacuated vessel as it passes the capping station, and means to rotate the auxiliary turntables on their axes as they pass the loading and unloading station, said means to secure the caps to the vessels comprising capping dies carried by said main turntable, and devices to actuate said dies at predetermined times.

13. In vessel capping machines, a main turntable, a set of auxiliary turntables mounted around the axis of the main turntable on axes parallel thereto, means to turn the main turntable continuously in one direction to bring each auxiliary turntable past an evacuating station, then past a capping station and then past a loading and unloading station, means for withdrawing air from a vessel on the auxiliary turntable while passing the evacuation station, means to secure the cap to the air-evacuated vessel as it passes the capping station, and means to rotate the auxiliary turntables on their axes as they pass the loading and unloading station, said auxiliary turntable having two vessel receiving sections diametrically opposite one another, said means to secure the caps to the vessels comprising capping dies carried by said main turntable, and devices to actuate said dies at predetermined times.

14. In a machine of the class described, a main turntable rotatable about a vertical axis, means to turn the same, a set of auxiliary turntables also rotatable about vertical axes and carried by the main turntable, means to turn said auxiliary turntables during a portion of each rotation of the main turntable, an evacuation chamber associated with each of said auxiliary turntables, and means for moving the evacuation chambers into and out of engagement with the turntables, said evacuation chambers acting to lock the auxiliary turntables against turning during the remainder of the rotation of the main turntable.

15. In a machine of the class described, a main turntable rotatable in one direction about a vertical axis, means to turn the same, a set of auxiliary turntables also rotatable about vertical axes and carried by the main turntable, means to turn said auxiliary turntables in an opposite direction during a portion of each rotation of the main turntable, an evacuation chamber associated with each of said auxiliary turntables, and means for moving the evacuation chambers into and out of engagement with the turntables, said evacuation chambers acting to lock the auxiliary turntables against turning during the remainder of the rotation of the main turntable.

16. In a machine of the class described, a main turntable rotatable about a vertical axis, means to turn the same, a set of auxiliary turntables also rotatable about vertical axes and carried by the main turntable, means to turn said auxiliary turntables during a portion of each rotation of the main turntable, and means to lock the auxiliary turntables against turning during the remainder of the rotation of the main turntable, said auxiliary turntables each comprising a base and a partition dividing it into two vessel-holding sections, and said locking means comprising a chamber having sides, a top, a bottom and a back, but open at the front, and said base having slots to receive the sides of said chamber, the partition serving as a closure for the front of the chamber, and means to advance and retract said chambers to and from their associated turntables.

17. In a machine of the class described, a main turntable rotatable about a vertical axis, means to turn the same, a set of auxiliary turntables also rotatable about vertical axes and carried by the main turntable, means to turn said auxiliary turntables during a portion of each rotation of the main turntable, and means to lock the auxiliary turntables against turning during the remainder of the rotation of the main turntable, said auxiliary turntables each comprising a base and a partition dividing it into two vessel-holding sections, and said locking means comprising a chamber having sides, a top, a bottom and a back, but open at the front, and said base having slots to receive the sides of said chamber, the partition serving as a closure for the front of the chamber, means to advance and retract said chambers to and from their associated turntables, and means for bodily adjusting said chamber up and down with respect to the bases of said auxiliary turntables.

18. In a machine of the class described, a main turntable rotatable about a vertical axis, means to turn the same, a set of auxiliary turntables also rotatable about vertical axes and carried by the main turntable, means to turn said auxiliary turntables during a portion of each rotation of the main turntable, and means to lock the auxiliary turntables against turning during the remainder of the rotation of the main turntable, said auxiliary turntables each comprising a base and a partition dividing it into two vessel-holding sections, and said locking means comprising a chamber having sides, a top, a bottom and a back, but open at the front, and said base having slots to receive the sides of said chamber, the partition serving as a closure for the front of the chamber, means to advance and retract said chambers to and from their associated turntables, and means for bodily adjusting said chamber up and down with respect to the bases of said auxiliary turntables, and capping dies carried by the top of said chamber.

19. In vessel capping machines, a main turntable, auxiliary turntables mounted on the main turntable, all said turntables turning on vertical axes, the auxiliary turntables having vertical walls, horizontally shiftable chambers cooperatively associated with the auxiliary turntables so as to be closed by the walls thereof, and contain a vessel to be air-evacuated and capped, means to turn said turntables, and means to advance and retract said chambers to and from their respective auxiliary turntables, means to periodically establish and release partial vacuums in said chambers, and capping dies carried by said chambers.

20. In vessel capping machines, a main turntable, auxiliary turntables mounted on the main turntable, all said turntables turning on vertical axes, the auxiliary turntables having vertical walls, horizontally shiftable chambers cooperatively associated with the auxiliary turntables so as to be closed by the walls thereof and contain a vessel to be air-evacuated and capped, means to turn said turntables, and means to advance and retract said chambers to and from their respective auxiliary turntables, means to periodically establish and release partial vacuums in said chambers, and capping dies carried by said chambers, together with fluid actuated means for operating said dies.

21. In vessel capping machines, a main turntable, auxiliary turntables mounted on the main turntable, all said turntables turning on vertical axes, the auxiliary turntables having vertical walls, horizontally shiftable chambers cooperatively associated with the auxiliary turntables so as to be closed by the walls thereof and contain a vessel to be air-evacuated and capped, means to turn said turntables, and means to advance and retract said chambers to and from their respective auxiliary turntables, means to periodically establish and release partial vacuums in said chambers, capping dies carried by said chambers, together with fluid actuated means for operating said dies, and means for moving the capping dies into contact with the caps of the vessel by the suction induced by the chamber evacuation means.

22. In combination with a turntable having an axial partition dividing it into two sections each of which is to receive a vessel to be treated, a transversely movable evacuating chamber and capping mechanism carrier, means to advance and retract said carrier to and from the turntable, the partition of the turntable serving as a closure for the chamber, capping mechanism carried by said carrier and including a capping die and plunger device with a fluid operated piston to advance and retract the same to and from the vessel to be capped, and means to establish a partial vacuum in said chamber.

23. In combination with a turntable having an axial partition dividing it into two sections each of which is to receive a vessel to be treated, a transversely movable evacuating chamber and capping mechanism carrier, means to advance and retract said carrier to and from the turntable, the partition of the turntable serving as a closure for the chamber, capping mechanism carried by said carrier and including a capping die and plunger device with a fluid operated piston to advance and retract the same to and from the vessel to be capped, and means to establish a partial vacuum in said chamber, said capping die and plunger being free to be sucked into contact with the vessel's cap by the establishment of the partial vacuum in the chamber, and means to break the vacuum in the chamber after the vessel has been air-evacuated and the cap secured in place.

24. In combination with a turntable having an axial partition dividing it into two sections each of which is to receive a vessel to be treated, a transversely movable evacuating chamber and capping mechanism carrier, means to advance and retract said carrier to and from the turntable, the partition of the turntable serving as a closure for the chamber, capping mechanism carried by said carrier and including a capping die and plunger device with a fluid operated piston to advance and retract the same to and from the vessel to be capped, and means to establish a partial vacuum in said chamber, said capping die and plunger being free to be sucked into contact with the vessel's cap by the establishment of the partial vacuum in the chamber, and means to break the vacuum in the chamber after the vessel has been air-evacuated and the cap secured in place, the plunger of said die and plunger device having a magnetized head for the purposes specified.

25. In a vessel capping machine having a revoluble shaft, a vessel supporting member connected to said shaft, an evacuation chamber arranged to be moved into and out of engagement with said member, said evacuation chamber being axially slidable on said shaft to permit adjustment thereof relative to said member, and means for maintaining said evacuation chamber in a fixed position on the shaft.

26. In a vessel capping machine, a movable conveyor, a plurality of vessel carrying units located on the conveyor, movable evacuation means connected to the conveyor and arranged to be moved into and out of engagement with said units, a capping mechanism associated with said evacuation means, a movable die mounted in said capping mechanism, said capping mechanism having ports controlled by said die for establishing communication with said evacuation chamber, and means for actuating said capping mechanism and withdrawing the air from the evacuation chamber whereby to secure the cap to the vessel in a partial vacuum and immediately thereafter breaking the vacuum.

27. In a vessel capping machine having a revoluble shaft, a main turntable connected to said shaft, auxiliary turntables operatively connected to the main turntable and arranged to support the vessels to be capped, an evacuating chamber associated with each of said auxiliary turntables, means slidably connecting the evacuating chamber to said shaft, piston means for actuating said evacuating chambers, a capping mechanism connected to the evacuating chamber and movable therewith, means for sequentially withdrawing the air from the evacuation chamber and applying the cap to the container at predetermined points in the path of travel of the turntables, and means operatively associated with the capping mechanism for breaking down the vacuum in the evacuating chamber after the caps are applied.

28. In a vessel capping machine, a revoluble supporting member arranged to receive a vessel to be capped, an evacuation chamber movable radially relative to the axis of said revoluble member, means for moving the evacuation chamber into and out of engagement with said revoluble member at predetermined points in the path of travel of said member, and means when the evacuation chamber is out of engagement with the revoluble member for moving the latter relative to the former, whereby to permit the withdrawal of the vessel on the revoluble supporting member.

29. In a vessel capping machine, a revoluble supporting member arranged to receive a vessel to be capped, an evacuation chamber movable laterally relative to said revoluble member, means for moving the evacuation chamber into and out of engagement with said revoluble member at predetermined points in the path of travel of said member, means when the evacuation chamber is in engagement with said revoluble member for capping the vessel, and means when the evacuation chamber is out of engagement with the revoluble member for moving the latter relative to the former, whereby to permit the withdrawal of the capped vessel.

30. In a vessel capping machine, a revoluble supporting member adapted to receive a vessel to be capped, an evacuation chamber movable radially relative to the axis of the revoluble member and provided with a capping die, means for moving the evacuation chamber into and out of engagement with said member at predetermined points in the path of travel of the revoluble member, means when the evacuation chamber is in engagement with said revoluble member for actuating the capping die so as to cap the vessel, and means when the evacuation chamber is out of engagement with the revoluble member for moving the latter relative to the former to permit the removal of the capped vessel.

FRANK L. DARLING.